United States Patent
Vikor

(10) Patent No.: US 10,145,992 B2
(45) Date of Patent: Dec. 4, 2018

(54) DIELECTRIC MIRROR

(71) Applicant: GUARDIAN EUROPE S.À R. L., Bertrange (LU)

(72) Inventor: Gyorgy Vikor, Oroshaza (HU)

(73) Assignee: Guardian Europe S.A.R.L., Bertrange (LU)

( * ) Notice: Subject to any disclaimer, the term of this patent is extended or adjusted under 35 U.S.C. 154(b) by 0 days.

(21) Appl. No.: 15/421,613

(22) Filed: Feb. 1, 2017

(65) Prior Publication Data

US 2017/0139089 A1    May 18, 2017

Related U.S. Application Data

(60) Division of application No. 14/030,076, filed on Sep. 18, 2013, now Pat. No. 9,594,195, which is a
(Continued)

(51) Int. Cl.
| | |
|---|---|
| *G02B 5/08* | (2006.01) |
| *G02B 27/14* | (2006.01) |
| *C03C 17/34* | (2006.01) |
| *C03C 17/36* | (2006.01) |
| *C03C 17/245* | (2006.01) |
| *C03C 17/22* | (2006.01) |

(52) U.S. Cl.
CPC .......... *G02B 5/0833* (2013.01); *C03C 17/225* (2013.01); *C03C 17/245* (2013.01); *C03C 17/2456* (2013.01); *C03C 17/3417* (2013.01); *C03C 17/3423* (2013.01); *C03C 17/3649* (2013.01); *G02B 27/142* (2013.01); *G02B 27/144* (2013.01); *C03C 2217/212* (2013.01); *C03C 2217/213* (2013.01); *C03C 2217/218* (2013.01); *C03C 2217/261* (2013.01); *C03C 2217/281* (2013.01); *C03C 2218/156* (2013.01)

(58) Field of Classification Search
CPC ............ G02B 1/10–1/118; G02B 5/08–5/0891
USPC .................................................. 359/577–590
See application file for complete search history.

(56) References Cited

U.S. PATENT DOCUMENTS

| | | |
|---|---|---|
| 5,372,874 A | 12/1994 | Dickey et al. |
| 5,450,238 A | 9/1995 | Bjornard et al. |
| | (Continued) | |

FOREIGN PATENT DOCUMENTS

| | | |
|---|---|---|
| EP | 1 923 362 | 5/2008 |
| EP | 1 942 356 | 7/2008 |
| | (Continued) | |

OTHER PUBLICATIONS

U.S. Appl. No. 14/030,076, filed Sep. 18, 2013; Vikor.
(Continued)

*Primary Examiner* — Bumsuk Won
*Assistant Examiner* — Jeffrey Madonna
(74) *Attorney, Agent, or Firm* — Nixon & Vanderhye P.C.

(57) ABSTRACT

A dielectric mirror includes a coating having alternating high and low index layers. The mirror coating has no metallic reflective layer of Al or Ag in certain example embodiments, and may have film side and/or glass side visible reflection of from about 50-90% (more preferably from about 60-80% and most preferably from about 65-75%) and visible transmission of from about 10-50% (more preferably from about 10-40% or 20-40%) in certain example embodiments.

18 Claims, 4 Drawing Sheets

Related U.S. Application Data continuation-in-part of application No. 13/766,025, filed on Feb. 13, 2013.

(56) References Cited

U.S. PATENT DOCUMENTS

| | | | |
|---|---|---|---|
| 5,543,229 | A | 8/1996 | Ohsaki et al. |
| 5,621,832 | A | 4/1997 | Yokoyama |
| 5,891,556 | A | 4/1999 | Anderson et al. |
| 6,337,124 | B1* | 1/2002 | Anderson ......... B32B 17/10036 |
| | | | 427/419.1 |
| 6,532,112 | B2* | 3/2003 | Chu ....................... G02B 1/116 |
| | | | 359/585 |
| 6,645,608 | B2 | 11/2003 | Schulz |
| 6,894,838 | B2 | 5/2005 | Mizrahi et al. |
| 6,903,512 | B2 | 6/2005 | Ohta et al. |
| 7,251,074 | B2 | 7/2007 | Shimoda et al. |
| 7,688,409 | B2 | 3/2010 | Wu |
| 8,045,269 | B2 | 10/2011 | Akiya |
| 9,594,195 | B2 | 3/2017 | Vikor |
| 2002/0001724 | A1 | 1/2002 | Anderson et al. |
| 2003/0026994 | A1* | 2/2003 | Hatakeyama ......... G02B 5/0858 |
| | | | 428/421 |
| 2003/0146709 | A1 | 8/2003 | Ohta et al. |
| 2003/0180547 | A1 | 9/2003 | Buhay et al. |
| 2007/0127126 | A1 | 6/2007 | Terada |
| 2008/0253009 | A1 | 10/2008 | Onishi et al. |
| 2009/0002830 | A1 | 1/2009 | Okamoto |
| 2009/0153953 | A1 | 6/2009 | Banerjee et al. |
| 2009/0237782 | A1 | 9/2009 | Takamatsu et al. |
| 2010/0188737 | A1 | 7/2010 | Terada |
| 2010/0310247 | A1 | 12/2010 | Oshima et al. |
| 2011/0019284 | A1 | 1/2011 | Hoeing |
| 2011/0096391 | A1 | 4/2011 | Kanai et al. |
| 2011/0164157 | A1 | 7/2011 | Katsuda |
| 2012/0177899 | A1* | 7/2012 | Unquera ................. C03C 17/36 |
| | | | 428/213 |
| 2012/0243077 | A1 | 9/2012 | Osawa et al. |
| 2013/0128342 | A1* | 5/2013 | Mitarai ............. B32B 17/10036 |
| | | | 359/359 |
| 2013/0242381 | A1 | 9/2013 | Pudleiner et al. |
| 2014/0168499 | A1* | 6/2014 | Sasaki .................. H04N 5/2251 |
| | | | 348/341 |

FOREIGN PATENT DOCUMENTS

| | | |
|---|---|---|
| JP | 58-11901 | 1/1983 |
| JP | 62-220903 | 9/1987 |
| JP | 2002-182020 | 6/2002 |
| JP | 2002-523798 | 7/2002 |
| JP | 2004-035941 | 2/2004 |
| JP | 2006-337770 | 12/2006 |
| JP | 2009-169064 | 7/2009 |
| JP | 2011-133532 | 7/2011 |
| JP | 2012-173350 | 9/2012 |
| WO | WO 00/11502 | 3/2000 |

OTHER PUBLICATIONS

U.S. Appl. No. 13/766,025, filed Feb. 13, 2013; Vikor.
"Optical Properties of Sputtered Multilayer Dielectric Mirrors", Motovilov, Soviet Journal of Optical Technology, American Institute of Physics, New York, vol. 34, No. 5, Sep. 1, 1967, pp. 595-599.
International Search Report dated Dec. 5, 2014.
JP Office Action for JP Application No. 2016-543971.

* cited by examiner

DIELECTRIC MIRROR

This application is a divisional of application Ser. No. 14/030,076, filed Sep. 18, 2013, which is a continuation-in-part of U.S. application Ser. No. 13/766,025, filed Feb. 13, 2013, the entire disclosures of which are hereby incorporated herein by reference in this application.

Certain example embodiments of this invention relate to dielectric mirrors and/or methods of making the same. Certain example embodiments relate to dielectric mirrors which realize film side and/or glass side visible reflection of from about 50-90% (more preferably from about 60-80% and most preferably from about 65-75%) and visible transmission of from about 10-50% (more preferably from about 10-40%, even more preferably from about 20-40%, and most preferably from about 25-35%).

BACKGROUND AND SUMMARY OF EXAMPLE EMBODIMENTS OF THE INVENTION

Mirrors have been in existence for years and have been used in many applications. Mirrors generally are either (a) first surface mirrors, where the mirror coating is provided between the viewer and the supporting glass substrate, or (b) second surface mirrors, where the supporting glass substrate is interposed between the viewer and the mirror coating. See, for example, U.S. Pat. Nos. 7,276,289 and 7,678,459; U.S. Publication Nos. 2006/0077580; 2007/0178316; 2008/0073203; 2008/0164173; 2010/0229853; 2011/0176212; and 2011/0176236. The entire contents of each of these patent documents are hereby incorporated herein by reference.

Mirrors often require the use of a metallic (Al or Ag) reflective layer. However, it would be desirable if mirrors could be provided without the need for a metallic reflective layer of Al or Ag.

Certain example embodiments of this invention relate to dielectric mirrors and/or methods of making the same. More particularly, certain example embodiments relate to dielectric mirrors having no metallic reflective layer (e.g., no Ag layer and no Al layer) and which are nonetheless capable of realizing film side and/or glass side visible reflection of from about 50-90% (more preferably from about 60-80% and most preferably from about 65-75%) and visible transmission of from about 10-50% (more preferably from about 10-40%, more preferably from about 20-40%, and most preferably from about 25-35%). In certain example embodiments, a layer of or including NiCr or the like, which may be slightly or significantly oxidized, may be provided in certain example instances. The dielectric mirrors may be first or second surface mirrors in certain example embodiments, given good performance regarding both glass side reflection and film side reflection. The mirrors may or may not be heat treated (e.g., thermally tempered and/or thermally bent) in certain example embodiments. In certain example instances, such dielectric mirrors may be used in consumer, commercial and/or digital signage applications such as picture frames, bathroom mirrors, TVs, and/or electronic devices.

In certain example embodiments of this invention, there is provided a dielectric mirror including a glass substrate supporting a coating, the coating comprising moving away from the glass substrate: a first transparent dielectric high refractive index layer comprising niobium oxide and/or titanium oxide, the first transparent dielectric high refractive index layer having a thickness of from about 70-140 nm; a second transparent dielectric low refractive index layer comprising silicon oxide, the second transparent dielectric low refractive index layer having a thickness of from about 30-140 nm; a third transparent dielectric high refractive index layer comprising niobium oxide and/or titanium oxide; a fourth transparent dielectric low refractive index layer comprising silicon oxide; a fifth transparent dielectric high refractive index layer comprising niobium oxide and/or titanium oxide; wherein the first transparent dielectric high index layer comprising niobium oxide and/or titanium oxide is at least 10 nm thicker than one or both of (a) the third transparent dielectric high refractive index layer comprising niobium oxide and/or titanium oxide, and/or (b) the fifth transparent dielectric high index layer comprising niobium oxide and/or titanium oxide; wherein the coating does not contain any metallic reflective layer based on Al or Ag; and wherein the dielectric mirror has (i) a film side visible reflectance or a glass side visible reflectance of from about 50-90%, and (ii) a visible transmission of from about 10-40%, and wherein the glass side visible reflectance of the mirror is at least about 30% higher or lower than is the film side visible reflectance of the mirror. The mirror may further comprise a symmetry adjusting layer located between the third transparent dielectric high refractive index layer and the fifth transparent dielectric high refractive index layer. The symmetry adjusting layer may comprise NiCr or the like, and may be at least partially oxided. The symmetry adjusting layer may be located between and contacting the third transparent dielectric high refractive index layer and the fourth transparent dielectric low refractive index layer comprising silicon oxide, or may be located between and contacting the fifth transparent dielectric high refractive index layer and the fourth transparent dielectric low refractive index layer comprising silicon oxide. Instead of using a symmetry adjusting layer, the glass substrate of the mirror may be a grey glass substrate to achieve visible reflectance asymmetry between the film side and glass side of the mirror.

In certain example embodiments of this invention, there is provided a dielectric mirror including a substrate supporting a coating, the coating comprising moving away from the substrate: a first dielectric layer having a refractive index (n) of from about 2.15 to 2.5; a second dielectric layer comprising silicon oxide; a third dielectric layer having a refractive index of from about 2.15 to 2.5; a fourth dielectric layer comprising silicon oxide; a fifth dielectric layer having a refractive index of from about 2.15 to 2.5; wherein the first dielectric layer is at least 20 nm thinner than one or both of the third dielectric layer and/or the fifth dielectric layer; and wherein the coating does not contain any metallic reflective layer.

In certain example embodiments of this invention, there is provided a dielectric mirror including a glass substrate supporting a coating, the coating comprising moving away from the glass substrate: a first transparent dielectric high refractive index layer comprising niobium oxide, the first transparent dielectric high refractive index layer having a thickness of from about 70-140 nm; a second transparent dielectric low refractive index layer comprising silicon oxide, the second transparent dielectric low refractive index layer having a thickness of from about 30-140 nm; a third transparent dielectric high refractive index layer comprising niobium oxide; a fourth transparent dielectric low refractive index layer comprising silicon oxide; a fifth transparent dielectric high index layer comprising niobium oxide; wherein the first transparent dielectric high index layer comprising niobium oxide is at least 10 nm thicker than one or both of the third transparent dielectric high refractive index layer comprising niobium oxide and/or the fifth transparent dielectric high index layer comprising niobium oxide; wherein the coating does not contain any metallic reflective layer; and wherein the dielectric mirror has a visible film side reflectance and/or a visible glass side reflectance of from about 50-90%, and visible transmission of from about 10-40%.

In certain example embodiments of this invention, there is provided a mirror including a substrate (e.g., glass substrate) supporting a coating, the coating comprising moving away from the substrate: a first dielectric layer having a thickness of from about 70-140 nm and a refractive index (n) of from about 2.15 to 2.5; a second dielectric layer comprising silicon oxide; a third dielectric layer having a refractive index of from about 2.15 to 2.5; a fourth dielectric layer comprising silicon oxide; a fifth dielectric layer having a refractive index of from about 2.15 to 2.5; wherein the first dielectric layer is at least 10 nm thicker than one or both of the third dielectric layer and/or the fifth dielectric layer; wherein the coating does not contain any metallic reflective layer; and wherein the mirror has a visible film side reflectance and/or a visible glass side reflectance of from about 50-90%, and visible transmission of from about 20-40%.

DETAILED DESCRIPTION OF EXAMPLE EMBODIMENTS OF THE INVENTION

Figure 1:
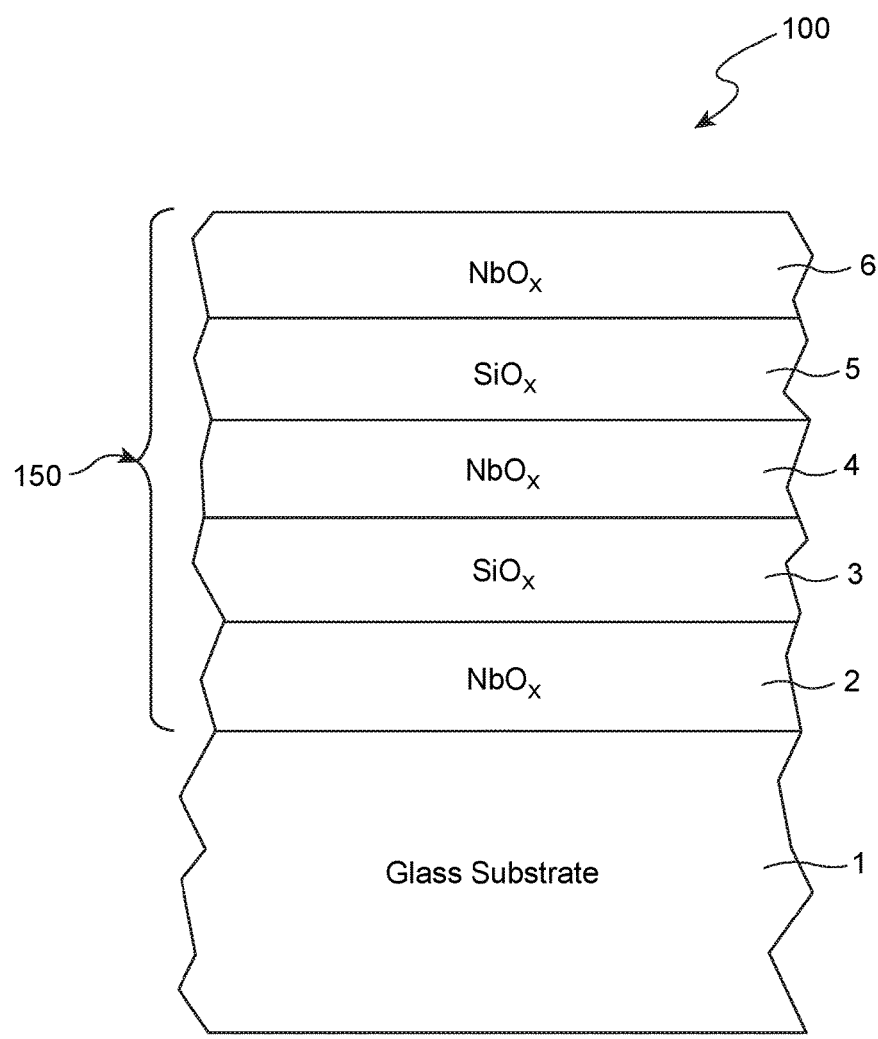
FIG. 1 is a cross sectional view of a dielectric mirror according to an example embodiment of this invention.

Referring now more particularly to the drawings in which reference numerals indicate like parts/materials throughout the several views.

FIG. 1 is a cross sectional view of a dielectric mirror 100 according to certain example embodiments of this invention. The mirror includes a dielectric coating 150 which is on a glass substrate 1. Glass substrate 1 may be soda-lime-silica based glass or any other suitable type of glass, and may be from about 1-10 mm thick, more preferably from about 2-6 mm thick, in example embodiments of this invention. Alternatively, substrate 1 may be of quartz, silicon, or the like. The mirror coating 150 includes high index transparent dielectric layers 2, 4 and 6 of or including niobium oxide (e.g., $Nb_2O_5$, $NbO_2$ and/or NbO) and low index transparent dielectric layers 3 and 5 of or including silicon oxide (e.g., $SiO_2$ which may or may not be doped with aluminum and/or nitrogen). In certain example embodiments, one or both of the silicon oxide layers 3 and/or 5 may be doped with other material such as from about 1-8% aluminum and/or from about 1-10% nitrogen. One or more of layers 2, 4 and 6 may also be doped with other material in certain example instances. In the FIG. 1 embodiment, layer 6 is the outermost layer of the coating 150 and may be exposed to air. Each of layers 2-7 is considered "transparent" because each of these layers, standing alone, is substantially transparent to visible light (e.g., at least about 50% transparent, more preferably at least about 60% or 70% transparent to visible light).

High index transparent dielectric layers 2, 4 and 6 of or including niobium oxide may have a refractive index (n) of from about 2.15 to 2.5, more preferably from about 2.2 to 2.4, and most preferably from about 2.25 to 2.35 (at 550 nm). In certain alternative embodiments, the niobium oxide may be replaced with titanium oxide (e.g., $TiO_2$), zirconium oxide, hafnium oxide (e.g., $HfO_2$), cerium oxide (e.g., $CeO_2$), zinc sulfide, or bismuth oxide (e.g., $Bi_2O_3$) in one or more of high index layers 2, 4 and/or 6. Thus, in one such example, layer 6 may be of or including titanium oxide, while layers 2 and 4 are of or including niobium oxide, and layers 3 and 5 are of or including silicon oxide. Low index transparent dielectric layers 3 and 5 of or including silicon oxide may have a refractive index (n) of from about 1.4 to 1.7, more preferably from about 1.4 to 1.6, and most preferably from about 1.45 to 1.55 (all refractive index n values herein are measured at 550 nm).

Transparent dielectric layers 2-6 are preferably deposited by sputtering in example embodiments of this invention. For example, transparent dielectric layers 2, 4 and 6 of or including niobium oxide may be sputter deposited via at least one sputtering target of or including Nb, via sputtering in an atmosphere including a mixture of argon and reactive oxygen gases. And for example, transparent dielectric layers 3 and 5 of or including silicon oxide may be sputter deposited via at least one sputtering target of or including Si or SiAl, via sputtering in an atmosphere including a mixture of argon and reactive oxygen gases. Rotation C-Mag sputtering targets, or other types of targets, may be used. In sputtering operations, sufficient reactive oxygen gas may be used to achieve the refractive index values discussed herein. Ceramic targets may alternatively be used to sputter deposit one or more of these layers. While layers 2-6 are preferably deposited via sputtering, it is possible that they may be deposited via other techniques in alternative embodiments of this invention. While mirror coating 150 consists of five layers in the FIG. 1 embodiment, it is possible that additional layers may be provided in alternative embodiments.

Dielectric mirror 100, in the FIG. 1 embodiment and in other example embodiments, contains no metallic reflective layer (e.g., no Ag layer and no Al layer), but is nonetheless capable of realizing film side and/or glass side visible reflection of from about 50-90% (more preferably from about 60-80% and most preferably from about 65-75%) and visible transmission of from about 10-50% (more preferably from about 10-40%, even more preferably from about 20-40%, and most preferably from about 25-35%). The high reflectance values are achieved, despite no metallic reflective layers, by way of the large refractive index differences between adjacent layers in the coating 150 in combination with the layer thickness values discussed herein. In certain example embodiments, the glass side reflectance (reflectance measured from the glass 1 side of the mirror) and the film side reflectance (reflectance measured from the film 150 side of the mirror) may be substantially symmetric (e.g., the glass side reflectance and film side reflectance of the mirror may differ by no more than about 10%). The refractive index and thickness values herein may also be tailored to allow transmitted and reflected color values (e.g., a* and/or b* color values) to be substantially neutral. The dielectric mirrors 100 may be first or second surface mirrors in certain example embodiments. The dielectric mirror 100 may be used, for example, as a beamsplitter. The mirrors 100 may or may not be heat treated (e.g., thermally tempered and/or thermally bent) in certain example embodiments. In certain example instances, such dielectric mirrors 100 may be used in consumer, commercial and/or digital signage applications such as picture frames, bathroom mirrors, TVs, and/or electronic devices. Theses mirrors may be used for electronic mirrors or hidden TVs for consumers, security, commercial, and/or digital signage applications. In certain electronic applications, when the display is on, the screen image can be viewed through the glass 1, and when the display is off the mirror 100 has the appearance of a mirror, given the reflectance and visible transmission values of the mirror discussed herein.

Figure 4:
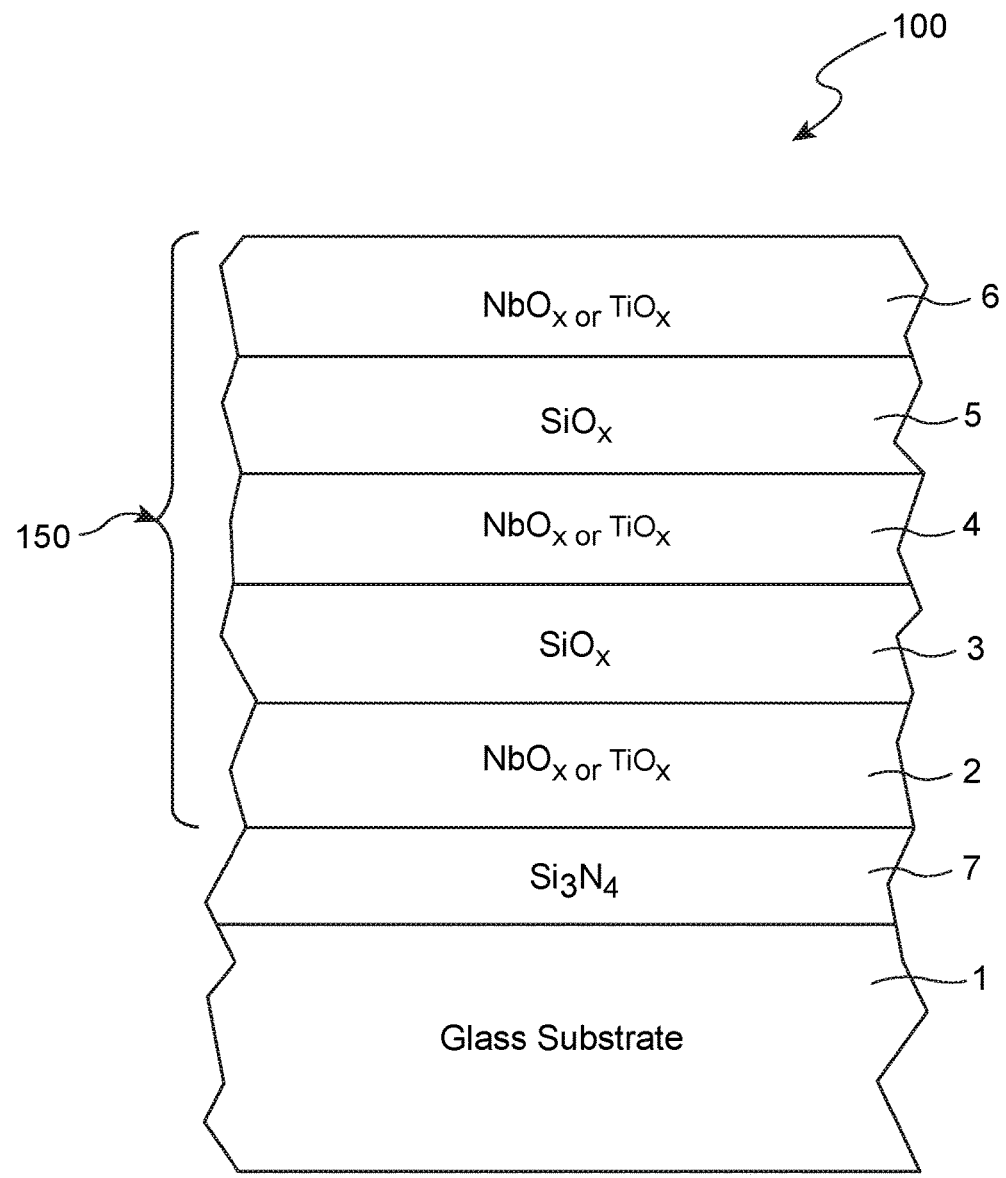
FIG. 4 is a cross sectional view of a dielectric mirror according to an example embodiment of this invention.

FIG. 4 is a cross sectional view of a dielectric mirror according to another example embodiment of this invention. The FIG. 4 embodiment is the same as the FIG. 1 embodiment, except that transparent dielectric barrier layer 7 is provided between the glass substrate 1 and high index layer 2. The barrier layer 7 is of or including silicon nitride (e.g., $Si_3N_4$) in certain example embodiments of this invention. In certain example embodiments, silicon nitride based barrier layer 7 may be doped with other material such as from about 1-8% aluminum and/or from about 1-10% oxygen. The FIG. 4 embodiment is particular useful in heat treated (e.g., thermally tempered) embodiments, where the barrier layer 7 helps prevent or reduce migration of elements (e.g., Na) from the glass substrate into the coating during the high temperature heat treatment. Such heat treatment (e.g., thermal tempering) may include, for example heating the coated article in an oven or the like at temperature(s) of at least about 580 degrees C., more preferably of at least about 600 degrees C. The mirror of the FIG. 4 embodiment may or may not be heat treated (e.g., thermally tempered) in example embodiments of this invention.

In certain example embodiments of this invention, transparent dielectric layer 2 of or including niobium oxide may be from about 70-140 nm thick, more preferably from about 80-130 nm thick, even more preferably from about 90-120 nm thick, with an example thickness being about 105 nm. In certain example embodiments of this invention, transparent dielectric layer 4 of or including niobium oxide may be from about 20-90 nm thick, more preferably from about 30-80 nm thick, even more preferably from about 40-65 nm thick, with an example thickness being about 52 nm. Similarly, in certain example embodiments of this invention, transparent dielectric layer 6 of or including niobium oxide may be from about 20-90 nm thick, more preferably from about 30-80 nm thick, even more preferably from about 40-70 nm thick, with an example thickness being about 54 nm. To realize the desired reflectance and transmission values herein, niobium oxide based layer 2 is preferably substantially thicker than each of niobium oxide based layers 4 and 6. For example, in certain example embodiments, niobium oxide based layer 2 is at least about 10 nm thicker (more preferably at least about 25 nm thicker, and most preferably at least about 40 nm thicker) than one or both of niobium oxide based layers 4 and/or 6.

In certain example embodiments of this invention, transparent dielectric layer 3 of or including silicon oxide may be from about 30-140 nm thick, more preferably from about 40-120 nm thick, even more preferably from about 60-120 nm thick, even more preferably from about 75-100 nm thick, with an example thickness being about 88 nm. Similarly, in certain example embodiments of this invention, transparent dielectric layer 5 of or including silicon oxide may be from about 30-140 nm thick, more preferably from about 40-120 nm thick, even more preferably from about 60-120 nm thick, even more preferably from about 75-100 nm thick, with an example thickness being about 88 nm. Thus, the silicon oxide based layers 3 and 5 may be of substantially the same thickness in certain example embodiments (i.e., the thickness of silicon oxide based layers 3 and 5 differs by no more than about 20 nm, more preferably by no more than about 10 nm, in certain example embodiments). And in certain example embodiments, one or both of silicon oxide based layers 3 and/or 5 are at least about 10 nm (more preferably at least about 15 nm) thinner than niobium oxide based layer 2, and is/are at least about 10 nm (more preferably at least about 20 nm) thicker than niobium oxide based layer(s) 4 and/or 6.

In certain example embodiments, transparent dielectric barrier layer 7 (which may also be sputter-deposited) may be from about 5-150 nm thick, more preferably from about 10-40 nm thick, even more preferably from about 10-30 nm thick, with an example thickness being about 20 nm. Barrier layer 7 may have a refractive index of from about 1.95 to 2.10, more preferably from about 2.0 to 2.05, in certain example embodiments.

Example 1

Figure 2:
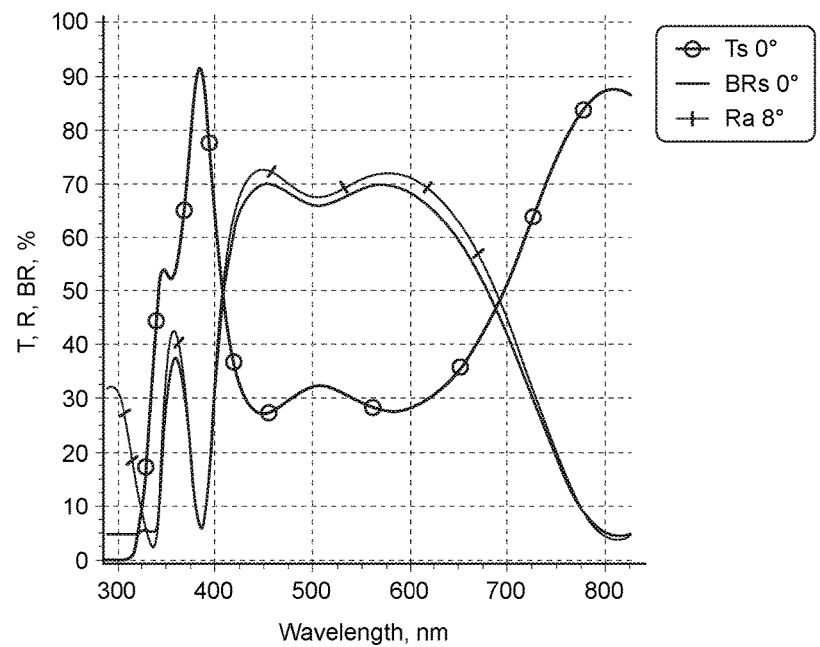
FIG. 2 is a modeled wavelength (nm) versus visible transmission (Ts), film side reflection (BRs), glass side reflection (Ra) graph illustrating optical characteristics of a dielectric mirror according to an example of the FIG. 1 embodiment.
Figure 3:
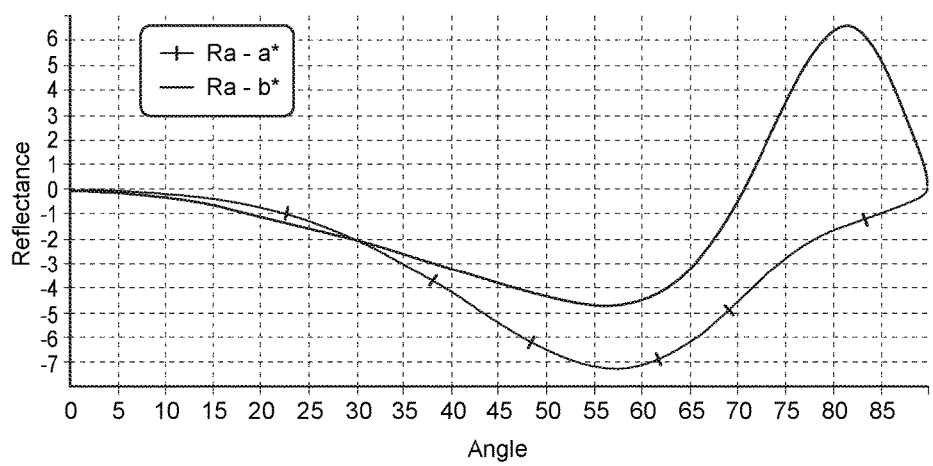
FIG. 3 is a modeled angle (degrees) versus glass side reflective a* and b* color values graph, illustrating angular distribution of reflected colors of a dielectric mirror according to the example of the FIG. 1 embodiment.

An example dielectric mirror 100, which is an example of this invention, was made as follows:
 clear glass substrate 1
 niobium oxide layer 2: 105 nm thick
 silicon oxide layer 3: 88 nm thick
 niobium oxide layer 4: 53 nm thick
 silicon oxide layer 5: 88 nm thick
 niobium oxide layer 6: 53 nm thick Optical properties of this example mirror are shown in FIGS. 2-3. A clear glass substrate was used. FIG. 2 is a modeled wavelength (nm) versus visible transmission (Ts), film side reflection (BRs), glass side reflection (Ra) graph illustrating optical characteristics of this example dielectric mirror; and FIG. 3 is a modeled angle (degrees) versus glass side reflective a* and b* color values graph, illustrating angular distribution of reflected colors of this example dielectric mirror. The following visible optical values (L*, visible transmission values (TY or TaY), visible reflectance values (film side RfY or BRa, glass side RgY or Ra), and visible transmissive/reflective color values a* and b*) were measured:

TABLE 1

|  | a* | b* | L* | Y |
|---|---|---|---|---|
| Transmission: | −0.53 | +0.17 | 62.42 | 30% |
| Glass side reflectance (Rg): | −0.04 | −0.08 | 86.88 | 70% |
| Film side reflectance (Rf): | −1.28 | +0.01 | 85.85 | 68% |

Thus, it can be seen from the above Table 1 that the dielectric mirror had a visible transmission of 30%, a visible glass side reflectance of 70%, and a visible film side reflectance of 68% (the glass side and film side reflectance was substantially the same). It can also be seen that the mirror had neutral (from −2 to +2) glass side and film side reflective color values a* and b*. These were measured in accordance with Ill. C, 2 degree. And it can be seen in FIG. 3 that the angular distribution of the reflected a* and b* color values showed no large fluctuations at angles from about 0-30 degrees.

An advantage of the mirror is that ultraviolet (UV) transmission at 385 nm is at least about 70%, more preferably at least about 75%, and most preferably at least about 80% or 85%, as shown in FIG. 2 (note the Ts curve in FIG. 2 at 385 nm), although the visible transmission is less than about 40%, more preferably less than about 35% as also shown in FIG. 2. This high UV transmission, coupled with the low visible transmission and high reflectance values, allows the mirror to be particularly suited for certain applications where high UV is desired.

Example 2

Another example dielectric mirror 100, which is an example of this invention, was made as follows:
clear glass substrate 1
niobium oxide layer 2: 108 nm thick
silicon oxide layer 3: 88 nm thick
niobium oxide layer 4: 55 nm thick
silicon oxide layer 5: 90 nm thick
niobium oxide layer 6: 53 nm thick Optical properties of this Example 2 mirror are as follows, regarding visible transmission (Ts or TY), visible reflectance (film side RfY and glass side RgY visible reflectance), and color values a*, b*:

TABLE 2

|  | a* | b* | L* | Y |
| --- | --- | --- | --- | --- |
| Transmission: | −0.5 | −0.8 | 60.4 | 29% |
| Glass side reflectance (Rg): | −0.6 | 0.7 | 86.8 | 70% |
| Film side reflectance (Rf): | 0.1 | 0.5 | 87.5 | 71% |

Thus, it can be seen from the above Table 2 that the dielectric mirror of this example had a visible transmission of 29%, a visible glass side reflectance of 70%, and a visible film side reflectance of 71% (the glass side and film side visible reflectance was substantially the same). It can also be seen that the mirror had neutral (from −2 to +2) glass side and film side reflective color values a* and b*. These were measured in accordance with Ill. C, 2 degree.

Example 3

Another example dielectric mirror 100, which is an example of this invention, was made as follows:
clear glass substrate 1
silicon nitride layer 7: 20 nm thick
niobium oxide layer 2: 98 nm thick
silicon oxide layer 3: 88 nm thick
niobium oxide layer 4: 55 nm thick
silicon oxide layer 5: 90 nm thick
niobium oxide layer 6: 53 nm thick Optical properties of this Example 3 mirror are as follows, regarding visible transmission (Ts or TY), visible reflectance (film side RfY and glass side RgY visible reflectance), and color values a*, b*:

TABLE 3

|  | a* | b* | L* | Y |
| --- | --- | --- | --- | --- |
| Transmission: | 1.8 | −1.4 | 60.5 | 29% |
| Glass side reflectance (Rg): | −2.6 | 0.9 | 86.4 | 69% |
| Film side reflectance (Rf): | −1.4 | 0.8 | 87.4 | 71% |

Thus, it can be seen from the above Table 3 that the dielectric mirror of this example (e.g., see FIG. 4) had a visible transmission of 29%, a visible glass side reflectance of 69%, and a visible film side reflectance of 71% (the glass side and film side visible reflectance was substantially the same). It can also be seen that the mirror had neutral (from −2 to +2) film side reflective color values a* and b*. These were measured in accordance with Ill. C, 2 degree.

Example 4

Another example dielectric mirror 100, which is an example of this invention, was made as follows:
clear glass substrate 1
niobium oxide layer 2: 124 nm thick
silicon oxide layer 3: 45 nm thick
niobium oxide layer 4: 72 nm thick
silicon oxide layer 5: 68 nm thick
niobium oxide layer 6: 71 nm thick Optical properties of this Example 4 mirror are as follows, regarding visible transmission (Ts or TY), visible reflectance (film side RfY and glass side RgY visible reflectance), and color values a*, b*:

TABLE 4

|  | a* | b* | L* | Y |
| --- | --- | --- | --- | --- |
| Transmission: | −2.7 | −3.1 | 69.0 | 39% |
| Glass side reflectance (Rg): | 0.4 | 2.5 | 80.9 | 58% |
| Film side reflectance (Rf): | 1.6 | 2.6 | 81.9 | 60% |

Thus, it can be seen from the above Table 4 that the dielectric mirror of this example had a visible transmission of 39%, a visible glass side reflectance of 58%, and a visible film side reflectance of 60% (the glass side and film side visible reflectance was substantially the same). It can also be seen that the mirror had substantially neutral (from −3.0 to +3.0) glass side and film side reflective color values a* and b*. These were measured in accordance with Ill. C, 2 degree.

Example 5

Another example dielectric mirror 100, which is an example of this invention, was made as follows:
clear glass substrate 1
silicon nitride layer 7: 21.4 nm thick
niobium oxide layer 2: 106.6 nm thick
silicon oxide layer 3: 43.3 nm thick
niobium oxide layer 4: 59.4 nm thick
silicon oxide layer 5: 80.1 nm thick
niobium oxide layer 6: 67.3 nm thick Optical properties of this Example 5 mirror are as follows, regarding visible transmission (Ts or TY), visible reflectance (film side RfY and glass side RgY visible reflectance), and color values a*, b*:

TABLE 5

|  | a* | b* | L* | Y |
| --- | --- | --- | --- | --- |
| Transmission: | −0.1 | −1.2 | 68.7 | 39% |
| Glass side reflectance (Rg): | 0.1 | 0.8 | 81 | 58% |
| Film side reflectance (Rf): | 0.3 | 0.4 | 82 | 60% |

Thus, it can be seen from the above Table 5 that the dielectric mirror of this example had a visible transmission of 39%, a visible glass side reflectance of 58%, and a visible film side reflectance of 60% (the glass side and film side visible reflectance was substantially the same). It can also be seen that the mirror had neutral (from −2 to +2) glass side and film side reflective color values a* and b*. These were measured in accordance with Ill. C, 2 degree.

Example 6

Another example dielectric mirror 100, which is an example of this invention, was made as follows:
clear glass substrate 1
niobium oxide layer 2: 19.5 nm thick
silicon oxide layer 3: 27 nm thick
niobium oxide layer 4: 59.1 nm thick
silicon oxide layer 5: 91.8 nm thick
niobium oxide layer 6: 57.6 nm thick Optical properties of this Example 6 mirror are as follows, regarding visible transmission (Ts or TY), visible reflectance (film side RfY and glass side RgY visible reflectance), and color values a*, b*:

TABLE 6

|  | a* | b* | L* | Y |
|---|---|---|---|---|
| Transmission: | −0.1 | −0.1 | 74.6 | 48% |
| Glass side reflectance (Rg): | −1.6 | 0.2 | 76.1 | 50% |
| Film side reflectance (Rf): | −0.6 | 0.2 | 77.0 | 51% |

Thus, it can be seen from the above Table 6 that the dielectric mirror of this example had a visible transmission of 48%, a visible glass side reflectance of 50%, and a visible film side reflectance of 51% (the glass side and film side visible reflectance was substantially the same). It can also be seen that the mirror had neutral (from −2 to +2) glass side and film side reflective color values a* and b*. These were measured in accordance with Ill. C, 2 degree.

Example 7

Another example dielectric mirror 100, which is an example of this invention, was made as follows:
clear glass substrate 1
silicon nitride layer 7: 20 nm thick
niobium oxide layer 2: 8.4 nm thick
silicon oxide layer 3: 20 nm thick
niobium oxide layer 4: 55.6 nm thick
silicon oxide layer 5: 89.4 nm thick
niobium oxide layer 6: 56.3 nm thick Optical properties of this Example 7 mirror are as follows, regarding visible transmission (Ts or TY), visible reflectance (film side RfY and glass side RgY visible reflectance), and color values a*, b*:

TABLE 7

|  | a* | b* | L* | Y |
|---|---|---|---|---|
| Transmission: | −0.1 | −0.1 | 74.6 | 48% |
| Glass side reflectance (Rg): | −1.6 | 0.2 | 76.1 | 50% |
| Film side reflectance (Rf): | −0.6 | 0.2 | 77.0 | 51% |

Thus, it can be seen from the above Table 7 that the dielectric mirror of this example had a visible transmission of 48%, a visible glass side reflectance of 50%, and a visible film side reflectance of 51% (the glass side and film side visible reflectance was substantially the same). It can also be seen that the mirror had neutral (from −2 to +2) glass side and film side reflective color values a* and b*. These were measured in accordance with Ill. C, 2 degree.

Example 8

Another example dielectric mirror 100, which is an example of this invention, was made as follows:
clear glass substrate 1
niobium oxide layer 2: 9 nm thick
silicon oxide layer 3: 20 nm thick
niobium oxide layer 4: 85 nm thick
silicon oxide layer 5: 103 nm thick
niobium oxide layer 6: 30 nm thick Optical properties of this Example 8 mirror are as follows, regarding visible transmission (Ts or TY), visible reflectance (film side RfY and glass side RgY visible reflectance), and color values a*, b*:

TABLE 8

|  | a* | b* | L* | Y |
|---|---|---|---|---|
| Transmission: | −0.9 | −0.7 | 80.7 | 58% |
| Glass side reflectance (Rg): | −0.7 | 1.0 | 69.5 | 40% |
| Film side reflectance (Rf): | 0.2 | 0.9 | 70.2 | 41% |

Thus, it can be seen from the above Table 8 that the dielectric mirror of this example had a visible transmission of 58%, a visible glass side reflectance of 40%, and a visible film side reflectance of 41% (the glass side and film side visible reflectance was substantially the same). It can also be seen that the mirror had neutral (from −2 to +2) glass side and film side reflective color values a* and b*. These were measured in accordance with Ill. C, 2 degree.

Example 9

Another example dielectric mirror 100, which is an example of this invention, was made as follows:
clear glass substrate 1
silicon nitride layer 7: 20 nm
niobium oxide layer 2: 8.4 nm thick
silicon oxide layer 3: 28.8 nm thick
niobium oxide layer 4: 60.3 nm thick
silicon oxide layer 5: 49 nm thick
niobium oxide layer 6: 80.1 nm thick Optical properties of this Example 9 mirror are as follows, regarding visible transmission (Ts or TY), visible reflectance (film side RfY and glass side RgY visible reflectance), and color values a*, b*:

TABLE 9

|  | a* | b* | L* | Y |
|---|---|---|---|---|
| Transmission: | −0.8 | 0.6 | 81.2 | 59% |
| Glass side reflectance (Rg): | −0.3 | 0.4 | 68.2 | 38% |
| Film side reflectance (Rf): | 0.1 | −0.4 | 69.3 | 40% |

Thus, it can be seen from the above Table 9 that the dielectric mirror of this example had a visible transmission of 59%, a visible glass side reflectance of 38%, and a visible film side reflectance of 40% (the glass side and film side visible reflectance was substantially the same). It can also be seen that the mirror had neutral (from −2 to +2) glass side and film side reflective color values a* and b*. These were measured in accordance with Ill. C, 2 degree.

Examples 1-9 according to this invention, set forth above, used clear glass substrates 1 and resulted in mirrors in each case having a glass side visible reflectance that was substantially the same as the mirror's film side visible reflectance. However, in alternative embodiments of this invention symmetrical glass and film side visible reflectance is not always desirable. In certain instances, it may be desired to have asymmetric glass side and film side visible reflectance for a mirror. Several approaches to this have been provided in example embodiments of this invention. A first approach (e.g., see Example 10 below) is to use a grey glass substrate 1 instead of a clear glass substrate in any of the FIG. 1-4 embodiments, and it has been found that this will result in asymmetrical glass side versus film side visible reflectance. A second approach is to provide a symmetry adjusting layer (e.g., of or including NiCr, NiCrOx, or the like) in the stack at a location designed to adjust the symmetry of the visible reflection between glass side and film side. With both approaches, mirrors can achieve glass side visible reflectance that is at least about 30% different than is the mirror's film side visible reflectance, more preferably at least about 40% different. Example 10 is an example of the first approach, where the glass substrate is adjusted to provided the asymmetry.

Example 10

Another example dielectric mirror 100, which is an example of this invention, was made as follows:
grey glass substrate 1
niobium oxide layer 2: 105 nm thick
silicon oxide layer 3: 110 nm thick
niobium oxide layer 4: 40 nm thick
silicon oxide layer 5: 110 nm thick
niobium oxide layer 6: 45 nm thick Optical properties of this Example 10 mirror are as follows, regarding visible transmission (Ts or TY), visible reflectance (film side RfY and glass side RgY visible reflectance), and color values a*, b* at a zero degree viewing angle:

TABLE 10

|  | a* | b* | L* | Y |
| --- | --- | --- | --- | --- |
| Transmission: | −0.2 | −2.2 | 44 | 14% |
| Glass side reflectance (Rg): | 0.4 | 0.5 | 86.5 | 69% |
| Film side reflectance (Rf): | −0.1 | −1.4 | 49.5 | 18% |

Thus, it can be seen from the above Table 10 that the dielectric mirror of this example had a visible transmission of 14%, a visible glass side reflectance of 69%, and a visible film side reflectance of 18% (the glass side and film side visible reflectance was non-symmetrical and substantially different). It can also be seen that the mirror had neutral (from −2 to +2) glass side and film side reflective color values a* and b*. These were measured in accordance with Ill. C, 2 degree. Surprisingly, providing a grey (gray) glass substrate in Example 10 provided the asymmetrical visible reflectance values and could be advantageous in certain instances. Thus, in certain example embodiments of this invention, for the mirror, the glass side visible reflectance is at least about 30% different than is the film side visible reflectance, more preferably at least about 40% different.

Figure 5A:
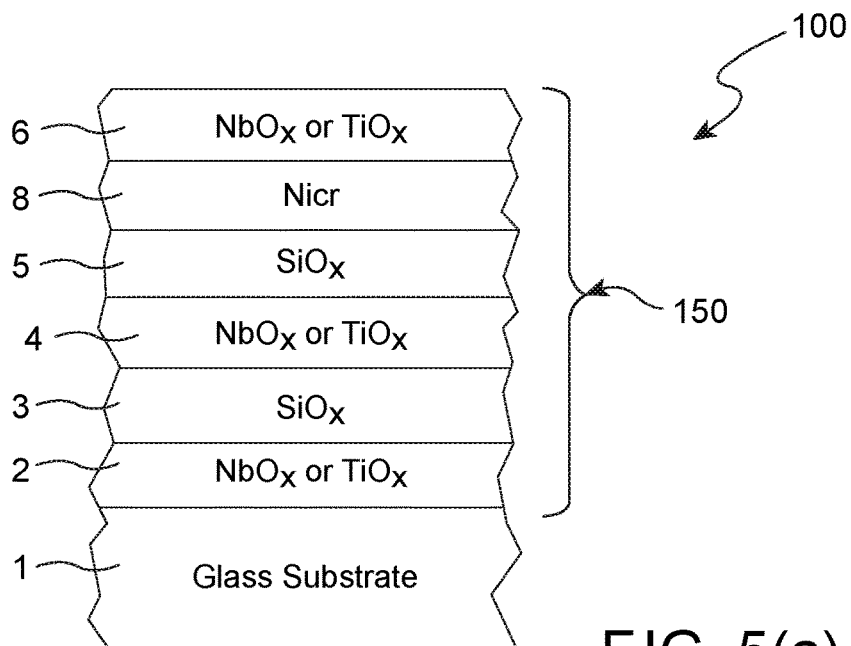
FIGS. 5(a) and 5(b) are cross sectional views of a dielectric mirror according to example embodiments of this invention.
Figure 5B:
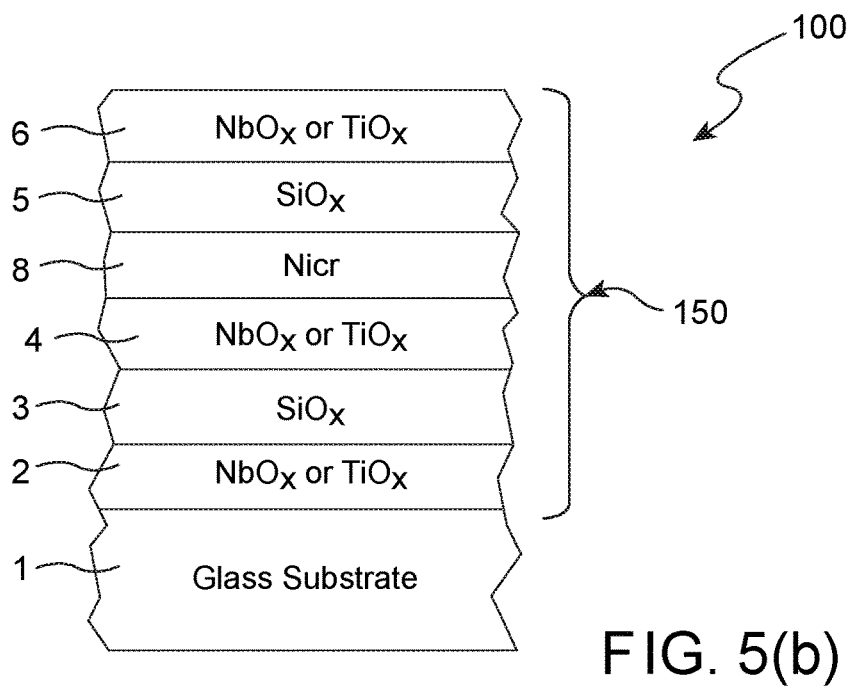

Examples 11 and 12 are examples of the second approach where a symmetry adjusting layer (e.g., of or including NiCr, NiCrOx, or the like) is provided in the mirror stack at a location designed to adjust the symmetry of visible reflection between glass side and film side and cause it to be asymmetric. The mirror of Example 11 is shown in FIG. 5(*a*) and the mirror of Example 12 is generally shown in FIG. 5(*b*). The FIGS. 5(*a*) and 5(*b*) embodiments are the same as the FIG. 1-4 embodiments discussed above, except that the additional symmetry adjusting layer 8 is provided in the stack. Of course, a silicon nitride inclusive layer 7 could also optionally be provided in the FIG. 5(*a*)-(*b*) embodiments if desired.

Example 11

An example dielectric mirror 100, which is an example of this invention, was made as follows:
clear glass substrate 1
niobium oxide layer 2: 130 nm thick
silicon oxide layer 3: 41 nm thick
niobium oxide layer 4: 67 nm thick
silicon oxide layer 5: 93 nm thick
NiCr symmetry adjusting layer 8: 20 nm thick
niobium oxide layer 6: 35.5 nm thick Example 12

An example dielectric mirror 100, which is an example of this invention, was made as follows:
clear glass substrate 1
niobium oxide layer 2: 102 nm thick
silicon oxide layer 3: 95 nm thick
niobium oxide layer 4: 52 nm thick
NiCr symmetry adjusting layer 8: 10 nm thick
silicon oxide layer 5: 49 nm thick
niobium oxide layer 6: 65 nm thick Providing the NiCr inclusive symmetry adjusting layer 8 results in an asymmetric visible reflectance between film side and glass side similar to that demonstrated above with Example 10. However, switching the location of the NiCr symmetry adjusting layer 8 (which may be slightly or significantly oxided) between the positions shown in FIGS. 5(*a*) and 5(*b*) has been found to invert the asymmetry. In other words, high glass side visible reflectance and low film side visible reflectance can be achieved by using one of the layer 8 locations whereas low glass side visible reflectance and high film side visible reflectance can be achieved by using the other layer 8 location. In both of Examples 11-12, the mirror has a visible transmission of from about 18-20%. However, the glass side visible reflectance was 66% and the film side visible reflectance was 10% in one of the two examples, while the glass side visible reflectance was 30% and the film side visible reflectance was 73% in the other of the two examples. Thus, it will be appreciated that the NiCr based layer 8 is not the layer that creates the reflection (instead, the NiCr based layer 8 reduces the reflection from one of the sides based on where it is located), but it does cause the visible reflection to be asymmetric between glass side and film side which may be desirable in certain instances. In certain example embodiments of this invention, the symmetry adjusting layer 8 (e.g., of or including NiCr, which may or may not be oxided) is from about 3 to 50 nm thick, more preferably from about 5-45 nm thick, even more preferably from about 5 to 30 nm thick, and most preferably from about 10 to 20 nm thick.

It is noted that optical characteristics such as visible transmission, a* and b* values, glass side visible reflectance, and film side visible reflectance are measured herein without taking into account any optional paint layers or physical backings that may be applied to or house the mirror.

While a layer, layer system, coating, or the like, may be said to be "on" or "supported by" a substrate, layer, layer system, coating, or the like, other layer(s) may be provided therebetween. Thus, for example, the coatings or layers described above may be considered "on" and "supported by" the substrate and/or other coatings or layers even if other layer(s) are provided therebetween.

In certain example embodiments of this invention, there is provided a dielectric mirror including a glass substrate 1 supporting a coating, the coating comprising moving away from the glass substrate: a first transparent dielectric high refractive index layer 2 comprising niobium oxide and/or titanium oxide, the first transparent dielectric high refractive index layer having a thickness of from about 70-140 nm; a second transparent dielectric low refractive index layer 3 comprising silicon oxide, the second transparent dielectric low refractive index layer having a thickness of from about 30-140 nm; a third transparent dielectric high refractive index layer 4 comprising niobium oxide and/or titanium oxide; a fourth transparent dielectric low refractive index layer 5 comprising silicon oxide; a fifth transparent dielectric high refractive index layer 6 comprising niobium oxide and/or titanium oxide; wherein the first transparent dielectric high index layer comprising niobium oxide and/or titanium oxide is at least 10 nm thicker than one or both of (a) the third transparent dielectric high refractive index layer comprising niobium oxide and/or titanium oxide, and/or (b) the fifth transparent dielectric high index layer comprising niobium oxide and/or titanium oxide; wherein the coating does not contain any metallic reflective layer based on Al or Ag; and wherein the dielectric mirror has (i) a film side visible reflectance or a glass side visible reflectance of from about 50-90%, and (ii) a visible transmission of from about 10-40%, and wherein the glass side visible reflectance of the mirror is at least about 30% higher or at least about 30% lower than is the film side visible reflectance of the mirror.

In the mirror of the immediately preceding paragraph, the first transparent dielectric high index layer comprising niobium oxide and/or titanium oxide may be at least 10 nm thicker than both of the third transparent dielectric high refractive index layer and the fifth transparent dielectric high index layer.

In the mirror of any of the preceding two paragraphs, the first transparent dielectric high index layer comprising niobium oxide and/or titanium oxide may be at least 25 nm thicker than one or both of the third transparent dielectric high refractive index layer and/or the fifth transparent dielectric high index layer.

In the mirror of any of the preceding three paragraphs, the first transparent dielectric high index layer comprising niobium oxide and/or titanium oxide may be at least 25 nm thicker than both of the third transparent dielectric high refractive index layer and the fifth transparent dielectric high index layer.

The mirror of any of the preceding four paragraphs may further comprise a symmetry adjusting layer 8 located between the third transparent dielectric high refractive index layer and the fifth transparent dielectric high refractive index layer. The symmetry adjusting layer may comprise NiCr or the like, and may be at least partially oxided. The symmetry adjusting layer 8 may be located between and contacting the third transparent dielectric high refractive index layer and the fourth transparent dielectric low refractive index layer comprising silicon oxide, or may be located between and contacting the fifth transparent dielectric high refractive index layer and the fourth transparent dielectric low refractive index layer comprising silicon oxide. Alternatively, the glass substrate of the mirror of any of the preceding four paragraphs may be a grey glass substrate.

In the mirror of any of the preceding five paragraphs, the first transparent dielectric high refractive index layer may comprise or consist essentially of niobium oxide.

In the mirror of any of the preceding six paragraphs, the third transparent dielectric high refractive index layer may comprise or consist essentially of niobium oxide.

In the mirror of any of the preceding seven paragraphs, the fifth transparent dielectric high refractive index layer may comprise or consist essentially of niobium oxide.

In the mirror of any of the preceding eight paragraphs, the third transparent dielectric high refractive index layer may be from about 30-80 nm thick.

In the mirror of any of the preceding nine paragraphs, the fourth transparent dielectric low refractive index layer comprising silicon oxide may be from about 40-120 nm thick.

In the mirror of any of the preceding ten paragraphs, the fifth transparent dielectric high refractive index layer may be from about 30-80 nm thick.

In the mirror of any of the preceding eleven paragraphs, the first transparent dielectric high refractive index layer may directly contact the glass substrate, or alternatively a layer 7 comprising silicon nitride may be located between and contacting the glass substrate 1 and the first transparent dielectric high refractive index layer 2.

In the mirror of any of the preceding twelve paragraphs, the second transparent dielectric low refractive index layer comprising silicon oxide may be located between and directly contacting the first and third transparent dielectric high refractive index layers.

In the mirror of any of the preceding thirteen paragraphs, all of the layers may be sputter-deposited layers.

In the mirror of any of the preceding fourteen paragraphs, each of the second and fourth transparent dielectric low refractive index layers comprising silicon oxide may be doped with aluminum.

In the mirror of any of the preceding fifteen paragraphs, the first, third, and fifth transparent dielectric high refractive index layers may each have a refractive index of from about 2.15 to 2.5.

In the mirror of any of the preceding sixteen paragraphs, the second and fourth transparent dielectric low refractive index layers comprising silicon oxide may each have a refractive index of from about 1.4 to 1.7.

In the mirror of any of the preceding seventeen paragraphs, the second and fourth transparent dielectric low refractive index layers comprising silicon oxide may each be: (i) thinner than the first transparent dielectric high refractive index layer, and (ii) thicker than at least one of the third and fifth transparent dielectric high refractive index layers.

In the mirror of any of the preceding eighteen paragraphs, the mirror may be thermally tempered.

In the mirror of any of the preceding nineteen paragraphs, the mirror may have neutral glass side reflective color values a* and b*, each of the glass side reflective a* and b* values being from about −2 to +2.

In the mirror of any of the preceding twenty paragraphs, the mirror may have neutral film side reflective color values a* and b*, each of the film side reflective a* and b* values being from about −2 to +2.

In certain example embodiments of this invention, there is provided a dielectric mirror including a substrate supporting a coating, the coating comprising moving away from the substrate: a first dielectric layer 2 having a refractive index (n) of from about 2.15 to 2.5; a second dielectric layer 3 comprising silicon oxide; a third dielectric layer 4 having a refractive index of from about 2.15 to 2.5; a fourth dielectric layer 5 comprising silicon oxide; a fifth dielectric layer 6 having a refractive index of from about 2.15 to 2.5; wherein the first dielectric layer is at least 20 nm thinner than one or both of the third dielectric layer and/or the fifth dielectric layer; and wherein the coating does not contain any metallic reflective layer.

The mirror of the immediately preceding paragraph may have a visible film side reflectance and/or a visible glass side reflectance of from about 40-90%, and visible transmission of from about 20-60%.

In the mirror of any of the preceding two paragraphs, at least one of the first, third and fifth dielectric layers may comprise niobium oxide.

In the mirror of any of the preceding three paragraphs, at least one of the first, third and fifth dielectric layers may comprise titanium oxide.

In the mirror of any of the preceding four paragraphs, the first dielectric layer may be at least 20 nm thinner than both of the third and fifth dielectric layers.

In the mirror of any of the preceding five paragraphs, the second dielectric layer comprising silicon oxide may be: (i) thicker than the first dielectric layer, and/or (ii) thinner than each of the third and fifth dielectric layers.

In the mirror of any of the preceding six paragraphs, the glass side and film side visible reflectance of the mirror may be substantially the same.

In the mirror of any of the preceding seven paragraphs, the mirror may have neutral glass side and/or film side reflective color values a* and b*, each of the glass side and/or film side reflective a* and b* values being from about −2 to +2.

In the mirror of any of the preceding eight paragraphs, the mirror may further comprise a layer comprising silicon nitride located between the substrate and the first dielectric layer.

In the mirror of any of the preceding nine paragraphs, the first dielectric layer may be at least 40 nm thinner than both of the third dielectric layer and the fifth dielectric layer.

In example embodiments of this invention there is provided a dielectric mirror including a glass substrate supporting a coating, the coating comprising moving away from the glass substrate: a first transparent dielectric high refractive index layer comprising niobium oxide, the first transparent dielectric high refractive index layer having a thickness of from about 70-140 nm; a second transparent dielectric low refractive index layer comprising silicon oxide, the second transparent dielectric low refractive index layer having a thickness of from about 30-140 nm; a third transparent dielectric high refractive index layer comprising niobium oxide; a fourth transparent dielectric low refractive index layer comprising silicon oxide; a fifth transparent dielectric high index layer comprising niobium oxide; wherein the first transparent dielectric high index layer comprising niobium oxide is at least 10 nm thicker than one or both of the third transparent dielectric high refractive index layer comprising niobium oxide and/or the fifth transparent dielectric high index layer comprising niobium oxide; wherein the coating does not contain any metallic reflective layer; and wherein the dielectric mirror has a visible film side reflectance and/or a visible glass side reflectance of from about 50-90%, and visible transmission of from about 10-40%.

In the mirror of the immediately preceding paragraph, the first transparent dielectric high index layer comprising niobium oxide may be at least 10 nm thicker than both of the third transparent dielectric high refractive index layer comprising niobium oxide and the fifth transparent dielectric high index layer comprising niobium oxide.

In the mirror of any of the preceding two paragraphs, the first transparent dielectric high index layer comprising niobium oxide may be at least 25 nm thicker than one or both of the third transparent dielectric high refractive index layer comprising niobium oxide and/or the fifth transparent dielectric high index layer comprising niobium oxide.

In the mirror of any of the preceding three paragraphs, the first transparent dielectric high index layer comprising niobium oxide may be at least 25 nm thicker than both of the third transparent dielectric high refractive index layer comprising niobium oxide and the fifth transparent dielectric high index layer comprising niobium oxide.

In the mirror of any of the preceding four paragraphs, one, two or all three of the first, third and fifth layers may consist essentially of niobium oxide.

In the mirror of any of the preceding five paragraphs, the dielectric mirror may have a visible film side reflectance of from about 60-80% and a visible glass side reflectance of from about 60-80%.

In the mirror of any of the preceding six paragraphs, the dielectric mirror may have a visible transmission of from about 25-35%.

In the mirror of any of the preceding seven paragraphs, the third transparent dielectric high refractive index layer comprising niobium oxide may be from about 30-80 nm thick.

In the mirror of any of the preceding eight paragraphs, the fourth transparent dielectric low refractive index layer comprising silicon oxide may be from about 40-120 nm thick.

In the mirror of any of the preceding nine paragraphs, the fifth transparent dielectric high refractive index layer comprising niobium oxide may be from about 30-80 nm thick.

In the mirror of any of the preceding ten paragraphs, the coating may consist essentially of the first, second, third, fourth and fifth layers.

In the mirror of any of the preceding eleven paragraphs, the first transparent dielectric high refractive index layer comprising niobium oxide may directly contact the glass substrate.

In the mirror of any of the preceding twelve paragraphs, the second transparent dielectric low refractive index layer comprising silicon oxide may be located between and directly contacting the first transparent dielectric high refractive index layer comprising niobium oxide and the third transparent dielectric high refractive index layer comprising niobium oxide.

In the mirror of any of the preceding thirteen paragraphs, the fourth transparent dielectric low refractive index layer comprising silicon oxide may be located between and directly contacting the third transparent dielectric high refractive index layer comprising niobium oxide and the fifth transparent dielectric high refractive index layer comprising niobium oxide.

In the mirror of any of the preceding fourteen paragraphs, the first, second, third, fourth, and fifth layers may be sputter-deposited layers.

In the mirror of any of the preceding fifteen paragraphs, each of the second and fourth transparent dielectric low refractive index layers comprising silicon oxide may be doped with aluminum and/or nitrogen.

In the mirror of any of the preceding sixteen paragraphs, the first, third, and fifth transparent dielectric high refractive index layers comprising niobium oxide may have a refractive index of from about 2.15 to 2.5, more preferably from about 2.2 to 2.4.

In the mirror of any of the preceding seventeen paragraphs, the second and fourth transparent dielectric low refractive index layers comprising silicon oxide may have a refractive index of from about 1.4 to 1.7, more preferably from about 1.4 to 1.6.

In the mirror of any of the preceding eighteen paragraphs, the second and fourth transparent dielectric low refractive index layers comprising silicon oxide may each be: (i) thinner than the first transparent dielectric high refractive index layer comprising niobium oxide, and (ii) thicker than both the third and fifth transparent dielectric high refractive index layers comprising niobium oxide.

In the mirror of any of the preceding nineteen paragraphs, the mirror may have an ultraviolet (UV) transmission at 385 nm of at least about 75%, more preferably of at least about 80%.

In the mirror of any of the preceding twenty paragraphs, the mirror may be heat treated (e.g., thermally tempered).

In the mirror of any of the preceding twenty-one paragraphs, the fifth layer may be the outermost layer of the coating.

In the mirror of any of the preceding twenty-two paragraphs, the mirror may have neutral glass side and/or film side reflective color values a* and b*, each of the glass side and/or film side reflective a* and b* values being from about −2 to +2.

The mirror of any of the preceding twenty-three paragraphs may further include a layer comprising NiCr located between at least the third dielectric layer and the fifth dielectric layer. The layer comprising NiCr may or may not contain at least some oxygen, and may be located either between and contacting the third and fourth dielectric layers, or between and contacting the fourth and fifth dielectric layers.

In example embodiments of this invention, there is provided a mirror including a substrate supporting a coating, the coating comprising moving away from the substrate: a first dielectric layer having a thickness of from about 70-140 nm and a refractive index (n) of from about 2.15 to 2.5; a second dielectric layer comprising silicon oxide; a third dielectric layer having a refractive index of from about 2.15 to 2.5; a fourth dielectric layer comprising silicon oxide; a fifth dielectric layer having a refractive index of from about 2.15 to 2.5; wherein the first dielectric layer is at least 10 nm thicker than one or both of the third dielectric layer and/or the fifth dielectric layer; wherein the coating does not contain any metallic reflective layer; and wherein the mirror has a visible film side reflectance and/or a visible glass side reflectance of from about 50-90%, and visible transmission of from about 20-40%.

In the mirror of the immediately preceding paragraph, (i) at least one of the first, third and fifth dielectric layers may comprise or consist essentially of niobium oxide, and/or (ii) at least one of the first, third and fifth dielectric layers may comprise or consist essentially of titanium oxide.

In the mirror of any of the preceding two paragraphs, the first dielectric layer may be at least 10 nm thicker than both of the third and fifth dielectric layers.

In the mirror of any of the preceding three paragraphs, the coating may consist essentially of the first, second, third, fourth and fifth layers.

In the mirror of any of the preceding four paragraphs, the second and fourth dielectric layers comprising silicon oxide may each be: (i) thinner than the first dielectric layer, and (ii) thicker than both the third and fifth dielectric layers.

In the mirror of any of the preceding five paragraphs, the mirror may have an ultraviolet (UV) transmission at 385 nm of at least about 75%, more preferably of at least about 80% or 85%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dielectric mirror including a substrate supporting a coating, the coating comprising moving away from the substrate:
   a first dielectric layer having a thickness of from about 70-140 nm and a refractive index (n) of from about 2.15 to 2.5;
   a second dielectric layer comprising silicon oxide;
   a third dielectric layer having a refractive index of from about 2.15 to 2.5;
   a fourth dielectric layer comprising silicon oxide;
   a fifth dielectric layer having a refractive index of from about 2.15 to 2.5;
   wherein the first dielectric layer is at least 10 nm thicker than one or both of the third dielectric layer and/or the fifth dielectric layer;
   wherein the coating does not contain any metallic reflective layer;
   wherein the mirror has a visible film side reflectance and/or a visible glass side reflectance of from about 50-90%, and visible transmission of from about 10-50%; and
   wherein the glass side visible reflectance of the mirror is at least about 30% higher or at least about 30% lower than is the film side visible reflectance of the mirror.

2. The mirror of claim 1, wherein at least one of the first, third and fifth dielectric layers comprises niobium oxide.

3. The mirror of claim 1, wherein at least one of the first, third and fifth dielectric layers comprises titanium oxide.

4. The mirror of claim 1, wherein the first dielectric layer is at least 10 nm thicker than both of the third and fifth dielectric layers.

5. The mirror of claim 1, wherein the second and fourth dielectric layers comprising silicon oxide are each: (i) thinner than the first dielectric layer, and (ii) thicker than both the third and fifth dielectric layers.

6. The mirror of claim 1, wherein the mirror has neutral glass side reflective and film side reflective color values a* and b*, each of the glass side and film side reflective a* and b* values being from about −2 to +2.

7. The mirror of claim 1, wherein the mirror further comprises a layer comprising silicon nitride located between the substrate and the first dielectric layer.

8. A dielectric mirror including a substrate supporting a coating, the coating comprising moving away from the substrate:
   a first dielectric layer having a refractive index (n) of from about 2.15 to 2.5;
   a second dielectric layer comprising silicon oxide;
   a third dielectric layer having a refractive index of from about 2.15 to 2.5;
   a fourth dielectric layer comprising silicon oxide;
   a fifth dielectric layer having a refractive index of from about 2.15 to 2.5;

wherein the first dielectric layer is at least 20 nm thinner than one or both of the third dielectric layer and/or the fifth dielectric layer;

wherein the coating does not contain any metallic reflective layer %; and wherein the glass side visible reflectance of the mirror is at least about 30% higher or at least about 30% lower than is the film side visible reflectance of the mirror.

9. The mirror of claim 8, wherein the mirror has a visible film side reflectance and/or a visible glass side reflectance of from about 40-90%, and visible transmission of from about 20-60%.

10. The mirror of claim 8, wherein at least one of the first, third and fifth dielectric layers comprises niobium oxide.

11. The mirror of claim 8, wherein at least one of the first, third and fifth dielectric layers comprises titanium oxide.

12. The mirror of claim 8, wherein the first dielectric layer is at least 20 nm thinner than both of the third and fifth dielectric layers.

13. The mirror of claim 8, wherein the second dielectric layer comprising silicon oxide is: (i) thicker than the first dielectric layer, and (ii) thinner than each of the third and fifth dielectric layers.

14. The mirror of claim 8, wherein the glass side and film side visible reflectance of the mirror are substantially the same.

15. The mirror of claim 8, wherein the mirror has neutral glass side and/or film side reflective color values a* and b*, each of the glass side and/or film side reflective a* and b* values being from about −2 to +2.

16. The mirror of claim 8, wherein the mirror further comprises a layer comprising silicon nitride located between the substrate and the first dielectric layer.

17. The mirror of claim 8, wherein the first dielectric layer is at least 40 nm thinner than both of the third dielectric layer and the fifth dielectric layer.

18. A dielectric mirror including a substrate supporting a coating, the coating comprising moving away from the substrate:

a first dielectric layer having a thickness of from about 70-140 nm and a refractive index (n) of from about 2.15 to 2.5;

a second dielectric layer comprising silicon oxide;

a third dielectric layer having a refractive index of from about 2.15 to 2.5;

a fourth dielectric layer comprising silicon oxide;

a fifth dielectric layer having a refractive index of from about 2.15 to 2.5;

wherein the first dielectric layer is at least 10 nm thicker than one or both of the third dielectric layer and/or the fifth dielectric layer;

wherein the coating does not contain any metallic reflective layer;

wherein the mirror has a visible film side reflectance and/or a visible glass side reflectance of from about 50-90%, and visible transmission of from about 10-50%; and wherein the coating consists essentially of the first, second, third, fourth and fifth layers.

* * * * *